(12) United States Patent
Ionescu et al.

(10) Patent No.: US 9,380,038 B2
(45) Date of Patent: Jun. 28, 2016

(54) BOOTSTRAP AUTHENTICATION FRAMEWORK

(71) Applicant: T-Mobile USA, Inc., Bellevue, WA (US)

(72) Inventors: Alexandru Catalin Ionescu, Bellevue, WA (US); Adrian Buzescu, Seattle, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 160 days.

(21) Appl. No.: 13/787,646

(22) Filed: Mar. 6, 2013

(65) Prior Publication Data

US 2013/0239189 A1   Sep. 12, 2013

Related U.S. Application Data

(60) Provisional application No. 61/609,139, filed on Mar. 9, 2012.

(51) Int. Cl.
| | |
|---|---|
| G06F 7/04 | (2006.01) |
| G06F 15/16 | (2006.01) |
| G06F 17/30 | (2006.01) |
| H04L 29/06 | (2006.01) |
| H04W 12/06 | (2009.01) |
| H04L 9/08 | (2006.01) |
| H04L 9/32 | (2006.01) |

(52) U.S. Cl.
CPC .......... *H04L 63/08* (2013.01); *H04L 29/06802* (2013.01); *H04L 63/0853* (2013.01); *H04W 12/06* (2013.01); *H04L 9/0838* (2013.01); *H04L 9/32* (2013.01); *H04L 29/06* (2013.01); *H04L 29/06755* (2013.01)

(58) Field of Classification Search
CPC ... H04L 29/06; H04L 29/06802; H04L 63/08; H04L 63/0853; H04L 9/0838; H04L 29/06755; H04L 9/32; H04W 12/06

USPC .......................................................... 726/2–6
See application file for complete search history.

(56) References Cited

U.S. PATENT DOCUMENTS

| | | | | |
|---|---|---|---|---|
| 7,221,935 | B2 * | 5/2007 | Barriga-Caceres | G06F 21/33 455/411 |
| 7,788,493 | B2 * | 8/2010 | Mononen et al. | 713/170 |
| 8,543,814 | B2 * | 9/2013 | Laitinen | H04L 9/0838 713/155 |
| 8,887,246 | B2 * | 11/2014 | Naslund | H04L 9/0841 726/4 |
| 2005/0177723 | A1 * | 8/2005 | Huang | H04L 9/0822 713/168 |
| 2005/0210500 | A1 * | 9/2005 | Stone | H04N 7/17318 725/31 |
| 2006/0218396 | A1 * | 9/2006 | Laitinen | H04L 9/0838 713/167 |
| 2006/0264202 | A1 * | 11/2006 | Hagmeier et al. | 455/411 |

(Continued)

*Primary Examiner* — Jeffrey Pwu
*Assistant Examiner* — Jayesh Jhaveri
(74) *Attorney, Agent, or Firm* — Lee & Hayes, PLLC

(57) ABSTRACT

A bootstrap authentication framework may automatically provide stored authentication credentials to an application server on behalf of an application. The bootstrap authentication framework may receive an access request from a protocol handler to access the authentication credentials stored in a subscriber identity module (SIM) of the electronic device. The access request may be initiated by an application that uses the authentication credentials to access a network service on an application server. In turn, the bootstrap authentication framework may provide the authentication credentials to the protocol handler when a digital signature associated with the protocol handler indicates that the protocol handler is allowed to access the authentication credentials.

20 Claims, 8 Drawing Sheets

(56) References Cited

U.S. PATENT DOCUMENTS

| | | | |
|---|---|---|---|
| 2008/0003980 A1* | 1/2008 | Voss | H04L 63/0853 455/411 |
| 2009/0125992 A1* | 5/2009 | Larsson | H04L 67/146 726/6 |
| 2009/0287922 A1* | 11/2009 | Herwono et al. | 713/155 |
| 2010/0005290 A1* | 1/2010 | Urien et al. | 713/155 |
| 2010/0153672 A1* | 6/2010 | Jogand-Coulomb et al. | 711/164 |
| 2010/0281262 A1* | 11/2010 | Cheng et al. | 713/171 |
| 2011/0107405 A1* | 5/2011 | Kisters | 726/5 |
| 2013/0007858 A1* | 1/2013 | Shah et al. | 726/6 |
| 2013/0166907 A1* | 6/2013 | Brown | H04L 9/3265 713/156 |
| 2013/0174241 A1* | 7/2013 | Cha et al. | 726/7 |

\* cited by examiner

BOOTSTRAP AUTHENTICATION FRAMEWORK

CROSS REFERENCE TO RELATED APPLICATION

This application claims priority to U.S. Provisional Patent Application No. 61/609,139 to Alexandru Catalin Ionescu, entitled "GBA Extensions and API", filed on Mar. 9, 2012, and incorporated herein by reference.

BACKGROUND

Electronic devices, such as smart phones and netbooks, may host applications that make network calls to request data and services from application servers that are accessible through a telecommunication network. For example, an electronic device may host a browser, an electronic mail client, and/or a media player. An application server may request that these applications provide authentication credentials to the application servers prior to distributing data and services to these applications.

Traditional telecommunication networks may use techniques such as subscriber profile insertion to insert authentication credentials in the form of subscriber identities into data or service request traffic originating from the applications on the electronic devices. In turn, the application servers may rely on such authentication credentials in order to authenticate and authorize the electronic devices to access data or services. For example, in a Multimedia Messaging Service (MMS) scenario, a Gateway GPRS Support Node (GGSN) of the telecommunication network may insert a Mobile Subscriber Integrated Services Digital Network Number (MSISDN) of a subscriber into a Hypertext Transfer Protocol (HTTP) Get Message or a HTTP Post Message that is destined for an application server.

However, there may be several drawbacks to the subscriber profile insertion techniques. First, the reliance on a data gateway of the telecommunication network to insert credential information into data or service request traffic may place additional resource burdens on the telecommunication network. Second, the application servers may be forced to rely on authentication credentials that are inserted by another entity in the data path in order to protect access to sensitive or valuable data or services. Moreover, subscriber profile insertion cannot be used in conjunction with encrypted data connections between electronic devices and application servers. The data gateway of the telecommunication network is incapable of inserting credentials into encrypted traffic between an electronic device and an application server. Further, current subscriber profile insertion techniques are not compatible with the use of Wi-Fi connections to connect electronic devices to application servers.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

DETAILED DESCRIPTION

Figure 1:
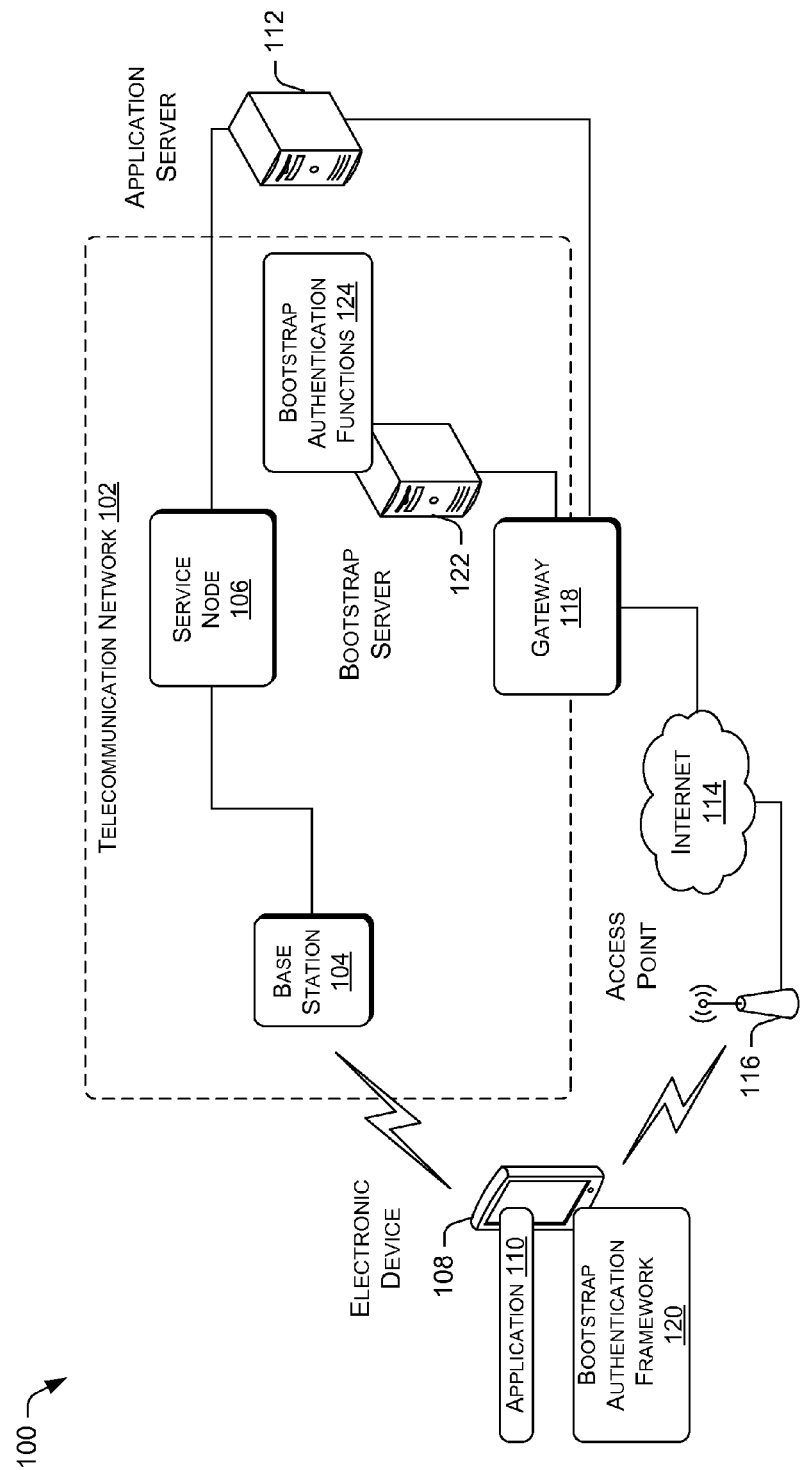
FIG. 1 is a block diagram showing an illustrative environment for implementing a bootstrap authentication framework on an electronic device to enable applications to authenticate to an application server using authentication credentials stored in a Subscriber Identity Module (SIM) of the electronic device.

Described herein are techniques for implementing a bootstrap authentication framework on an electronic device. The bootstrap authentication framework may enable applications on the electronic device to authenticate to an application server using authentication credentials that are stored in the Subscriber Identity Module (SIM) of the electronic device. The bootstrap authentication framework may act as an extension to the protocol handlers that are in installed on the electronic device. In turn, the bootstrap authentication framework may provide application programming interfaces (APIs) to the protocol handlers. The protocol handlers may call the APIs to obtain the authentication credentials that are stored in the SIM of the electronic device. The SIM may be contained in a Universal Integrated Circuit Card (UICC) that is a removably installed in the electronic device. The protocol handlers may include a hypertext transfer protocol (HTTP) client, a transport layer security (TLS) client, a multimedia messaging service (MMS) client, and/or other protocol handlers.

The bootstrap aspect of the authentication framework refers to the fact that the authentication framework is capable of bootstrapping, i.e., communicating with a bootstrap authentication credential server on a network, also referred to as a bootstrap server, to negotiate and obtain the authentication credentials. The bootstrap authentication framework may store the authentication credentials in the SIM of the electronic device. In various scenarios, the authentication credentials may include a temporary identifier and a shared secret key. In some embodiments, the bootstrapping functionality of the bootstrap authentication framework may comply with the Generic Bootstrapping Architecture (GBA) that is standardized by the $3^{rd}$ Generation Partnership Project (3GPP).

The bootstrap authentication framework may include an access control function that limits access to its APIs to applications that have valid digital signatures. For example, the bootstrap authentication framework may allow an email application with a valid digital signature to use a protocol handler to access the stored authentication credentials through the bootstrap authentication framework. On the other hand, the bootstrap authentication framework may block a browser application without a digital signature or with an invalid digital signature from accessing the stored authentication credentials. In this way, the bootstrap authentication framework may prevent unauthorized applications from accessing the authentication credentials that are stored in the SIM of the electronic device.

Thus, the implementation of the bootstrap authentication framework in an electronic device may enable authorized applications and/or protocol handlers on the electronic device to access the authentication credentials stored in the SIM of the electronic device. Otherwise, the authentication credentials in the SIM of the electronic device are inaccessible to such applications and/or protocol handlers. The applications and/or protocol handlers may use the authentication credentials to automatically authenticate to application servers that provide data and/or services without requesting user input of user credentials.

The implementation of the bootstrap authentication framework in the electronic device may provide several advantages over traditional techniques such as subscriber profile insertion for the purpose of authentication to application servers. For example, unlikely subscriber profile insertion techniques, the bootstrap authentication framework may automatically provide stored authentication credentials for authentication even when the electronic device is connected to an application server via a Wi-Fi connection.

Furthermore, the bootstrap authentication framework may automatically provide the stored authentication credentials to an application server even when an application is engaged in encrypted communication with the application server. In contrast, traditional techniques such as subscriber profile insertion are generally incompatible with encrypted communication links.

Overview

FIG. 1 is a block diagram showing an illustrative environment 100 for implementing a bootstrap authentication framework on an electronic device to enable applications to authenticate to an application server using authentication credentials stored in the Subscriber Identity Module (SIM) of the electronic device.

The environment 100 may include a telecommunication network 102 that is operated by a telecommunication carrier. The telecommunication network 102 may include a base station 104 and a service node 106. The base station 104 may handles traffic and signals between electronic devices, such as the electronic device 108, and the core network of the telecommunication network 102. For example, the base station 104 may perform the transcoding of speech channels, allocation of radio channels to electronic device, paging, transmission and reception of voice and data, as well as other functions. The base station 104 may include several base transceiver stations (BTS), each BTS may include a transceiver, antenna, and additional network switch and control equipment that provide a network cell for facilitating wireless communication between electronic devices and the core network of the telecommunication network 102.

The service node 106 may be a part of a core network of the telecommunication network 102. The core network may be responsible for routing voice communication to other telecommunication networks, as well as routing data communication to external packet switched networks, such as the Internet. For example, the service node 106 may be a Gateway GPRS Support Node (GGSN) or another equivalent node. The electronic device 108 may be a smart phone, a personal digital assistant, a netbook, a laptop computer, and/or another electronic that is capable of sending or receiving voice or data via the telecommunication network 102 and/or a Wi-Fi network. The application server 112 may be a server that is external to the telecommunication network 102. For example, the application server 112 may be connected to the telecommunication network 102 via one or more external packet switched networks, such as the Internet.

In some instances, an application 110 on the electronic device 108 may establish data communication with the application server 112 through a data connection to the base station 104, which is then route to the application server 112 through the core network via the service node 106. In such instances, the service node 106 may be capable of performing subscriber profile insertion with respect to data traffic between the application 110 on the electronic device 108 and the application server 112.

For example, the application 110 may be a navigation application that is using a data request to fetch map data from the application server 112. The application server 112 may be configured to verify profile information prior to providing map data to a requesting application. In such an example, the service node 106 may identify the electronic device 108 by a unique identifier of the electronic device 108, such as an international mobile subscriber identity (IMSI). In turn, the service node 106 may retrieve a profile that corresponds to the IMSI, and insert the profile into the data request from the application 110. Accordingly, when the data request with the profile arrives at the application server 112, the application server 112 may verify that the profile corresponds to a valid subscription, and subsequently transmit map data back to the application 110 via the telecommunication network 102.

However, in instances in which the application 110 on the electronic device 108 connects to the application server 112 via the Internet 114, the service node 106 may be incapable of performing subscriber profile insertion. In such instances, the application 110 may connect to the Internet 114 via Wi-Fi access point 116. Accordingly, data traffic from the application 110 may be directly routed to the application server 112 by the gateway 118 of the telecommunication network 102. As such, the service node 106 may not be afforded an opportunity to perform the subscriber profile insertion.

Nevertheless, the implementation of the bootstrap authentication framework 120 on the electronic device 108 may enable the application 110 to use authentication credentials stored on the electronic device 108 to authenticate to the application server 112 in these instances. In various embodiments, the bootstrap authentication framework 120 may arrange for a set of authentication credentials to be shared between the electronic device 108 and a bootstrap server 122 that implemented within the telecommunication network 102. For example, the bootstrap server 122 may include bootstrap authentication functions 124 that negotiate a shared secret, i.e., the authentication credentials, with the bootstrap authentication framework 120. The negotiated authentication credentials may be stored by the bootstrap authentication framework 120 in the SIM of the electronic device 108, and by the bootstrap authentication functions 124 in the bootstrap server 122.

Subsequently, when the application 110 requests data and/or service from the application server 112, a protocol handler under direction of the application 110 may use the bootstrap authentication framework 120 to retrieve the authentication credentials from the SIM of the electronic device. Once retrieved, the protocol handler on the electronic device 108 may provide the authentication credentials to the application server 112. The application server 112 may also request a set of authentication credentials that correspond to the electronic device 108 from the bootstrap server 122. The application server 112 may compare a secret key included in the authentication credentials received from the electronic device 108 with a corresponding secret key included in the authentication credentials received from the bootstrap server 122. Thus, if the two secret keys match, the application server 112 may provide the requested data and/or service to the application 110 on the electronic device 108.

Example Bootstrap Authentication Framework Components

Figure 2:
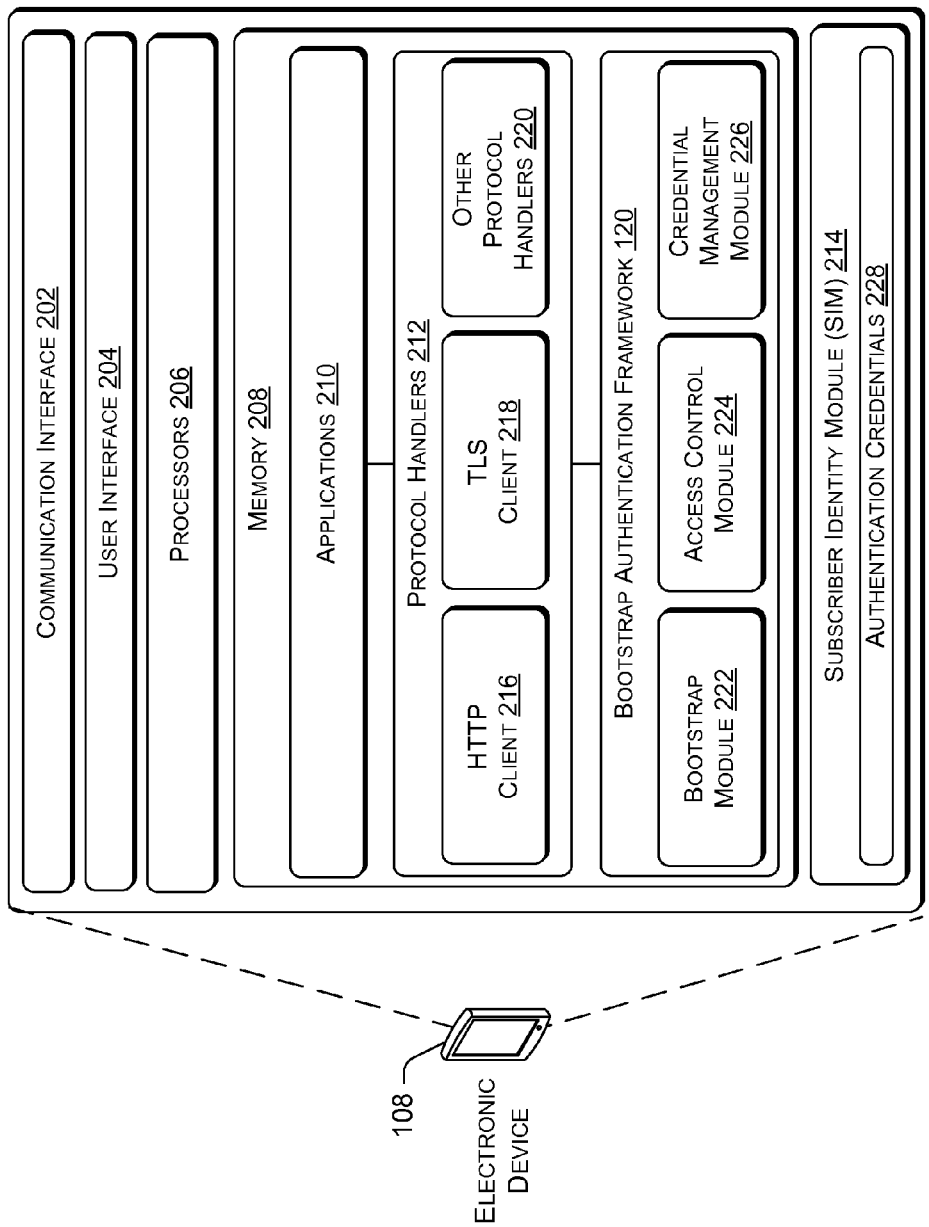
FIG. 2 is a block diagram that illustrates selected components of a bootstrap authentication framework on an electronic device.

FIG. 2 is a block diagram that illustrates selected components of a bootstrap authentication framework that is implemented on the electronic device 108. The electronic device 108 may include a communication interface 202, a user interface 204, one or more processors 206, and/or memory 208. The communication interface 202 may include wireless and/or wired communication components that enable the electronic device to transmit or receive voice or data communication via the telecommunication network 102 or the Internet 114. The user interface 204 may enable a user to provide inputs and receive outputs from the electronic device 108. The user interface may include a data output device (e.g., visual display, audio speakers), and one or more data input devices. The data input devices may include, but are not limited to, combinations of one or more of keypads, keyboards, mouse devices, touch screens, microphones, speech recognition packages, and any other suitable devices or other electronic/software selection methods.

The memory 208 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism.

The one or more processors 206 and the memory 208 of the electronic device 108 may implement one or more applications 210, one or more protocol handlers 212, a bootstrap authentication framework 120, as well as other modules that enable the electronic device 108 to perform telephony and data exchange functions. The electronic device 108 may also include a subscriber identity module (SIM) 214.

The applications 210 may include applications that provide utility, entertainment, and/or productivity functionalities to a user of the electronic device 108. In the course of providing these functionalities, the applications 210 may transmit and receive data from application servers that are accessible via the telecommunication network 102 and/or the Internet 114. For example, the applications 210 may include electronic mail applications, remote desktop applications, web browser applications, navigation applications, multimedia streaming applications, and/or so forth.

The protocol handlers 212 may include clients that are used by the applications 210 to request and receive data from the application servers, such as the application server 112. For example, the protocol handlers 212 may include a HTTP client 216. A navigation application may use the HTTP client 216 may be used to establish a HTTP connection with the application server 112, such that the navigation application may receive map data from the application server 112. In another example, the protocol handlers 212 may be a transport layer security (TLS) client 218. A web browser application may use TLS client 218 to establish a TLS connection with the application server 112, so that an encrypted session may be initiated between a program on the application server 112 and the web browser application. Nevertheless, the protocol handlers 212 may include other protocol handlers 220 that provide unencrypted or encrypted data connections between application servers and applications on the electronic device 108, e.g., an Internet Message Access Protocol (IMAP) client, a file transfer protocol (FTP client, secure socket layer (SSL), and/or so forth.

In some embodiments, a protocol handler may be an application entity that executes independently from the applications 210. In such embodiments, an application may call such a protocol handler as a service to establish a data communication. However, in other embodiments, a protocol handler may be a library that is loaded and executed in the same process as the application. In other words, an application may have an integrated protocol handler. The protocol handlers 212 may be configured to interact with the bootstrap authentication framework 120 by calling APIs of the bootstrap authentication framework.

The bootstrap authentication framework 120 may include a bootstrap module 222, an access control module 224, and a credential management module 226. The bootstrap authentication framework 120 may provide APIs that are called by the protocol handlers 212 to perform various functions.

The bootstrap module 222 may negotiate and obtain authentication credentials from the bootstrap server 122. In various embodiments, the bootstrap module 222 and the bootstrap server 122 may mutually authenticate through the use of authentication keys and/or digital certificates. The authentication keys and/or the digital certificates may be stored in the SIM 214 of the electronic device 108 and known to the bootstrap authentication functions 124 of the bootstrap server 122. Following mutual authentication, the bootstrap authentication functions 124 and the bootstrap module 22 may agree on shared secrets, i.e., authentication credentials 228.

In at least one embodiment, the authentication credentials 228 may include a temporary identifier and a shared secret key. The authentication credentials 228 may be configured to expire, i.e., become invalid, after a predetermined time period has expired. The bootstrap module 222 may store the authentication credentials 228 in the SIM 214. In some of these embodiments, the bootstrapping of the authentication credential performed by the bootstrap module 222 may comply with the Generic Bootstrapping Architecture (GBA) that is standardized by the $3^{rd}$ Generation Partnership Project (3GPP).

The access control module 224 may regulate whether the protocol handlers 212 that are employed by the applications 210 have access to the authentication credentials 228. The access control module 224 may perform such access control based on the digital signatures provided by the protocol handlers 212. In instances in which a protocol handler is a library that is called by an application, the protocol handler may inherit the digital signature of the application. In other words, the protocol handler may share the same digital signature as the application. In instances in which a protocol handler is a separate application entity that offers services to the application, the protocol handler may have its own digital signature. An application or a protocol handler may have a digital signature that is assigned by an administrator of the bootstrap server 122. For example, a developer of the application or the protocol handler may present the application or the protocol handler to the administrator. In turn, the administrator may digitally sign the application or the protocol handler after verifying that the application or the protocol handler complies with one or more criteria mandated by the administrator. For example, the administrator may mandate that an application or a protocol handler meet certain design, security, utility, and/or fee payment criteria.

In some embodiments, the access control module 224 may store the digital signatures of applications or protocol handlers in a data store in the memory 208. Accordingly, the access control module 224 may compare the digital signature of a requesting protocol handler to the stored digital signatures and provide access to the authentication credentials 228 when the digital signature matches one of the stored digital signatures. Otherwise, the access control module 224 may deny the requesting protocol handler access to the authentication credentials 228.

In other embodiments, the access control module 224 may determine access to the authentication credentials by comparing the digital signature of an application to digital signatures that are stored on the bootstrap server 122. In such embodiments, the access control module 224 may send the digital signature of a requesting protocol handler to the bootstrap server 122. In turn, the bootstrap server 122 may determined whether the digital signature of the requesting protocol handler matches one of the permitted digital signatures stored in a database. When such a match occurs, the bootstrap server 122 may return an indication to the access control module 224. The indication may cause the access control module 224 to permit the requesting protocol handler to access the authentication credentials 228. Otherwise, the access control module 224 may deny the requesting protocol handler access to the authentication credentials 228.

Alternatively or concurrently, the access control module 224 may determine whether a protocol handler has access to the authentication credentials 228 based on the additional access control settings for the protocol handler as stored by the bootstrap authentication framework 120. The access control settings for the protocol handler may be set by the developer of the protocol handler or the administrator of the bootstrap server 122. Thus, the access control module 224 may nevertheless deny a protocol handler access to the authentication credentials 228 even if the protocol hander possesses the correct digital signature. In additional embodiments, the access control module 224 may determine whether a protocol handler has access to the authentication credentials 228 based on the file location of the protocol handler. For example, the access control module 224 may be configured to allow the protocol handler access if the protocol handler is located in a system partition of an operating system installed on the electronic device 108.

The credential management module 226 may retrieve the authentication credentials 228 from the SIM 214 and provide the authentication credentials 228 to the protocol handlers. The credential management module 226 may perform such functions as directed by the access control module 224. The SIM 214 may store the authentication credentials 228. In various embodiments, the SIM 214 may be contained in a UICC that is removably installed on the electronic device 108. Accordingly, the electronic device 108 may be provided with different SIMs over its operational lifetime.

While the bootstrap authentication framework 120 may be used in the context of the application 110 communicating with the application server 112 via the Internet 114, the bootstrap authentication framework 120 may be adapted for use in instances in which the data communication between the application 110 and the application server 112 is established through the base station 104 and the service node 106 of the core network. In such instances, the core network may facilitate access to the bootstrap authentication functions 124 on the bootstrap server 122 by the bootstrap authentication framework 120.

The electronic device 108 may include other modules and components that are typically associated with a mobile computer device, such as software and hardware that enables the electronic device 108 to receive, process, and output signals. These signals may include touch signals, optical signals, motion sensing signals, electrical signals, audio signals, video signals, etc. Accordingly, the modules and components of the electronic device 108 may enable the electronic device 108 to perform various functions. These functions may include telephony functions, data processing function, data transmission and reception functions, and/or the like.

Example Bootstrap Server Components

Figure 3:
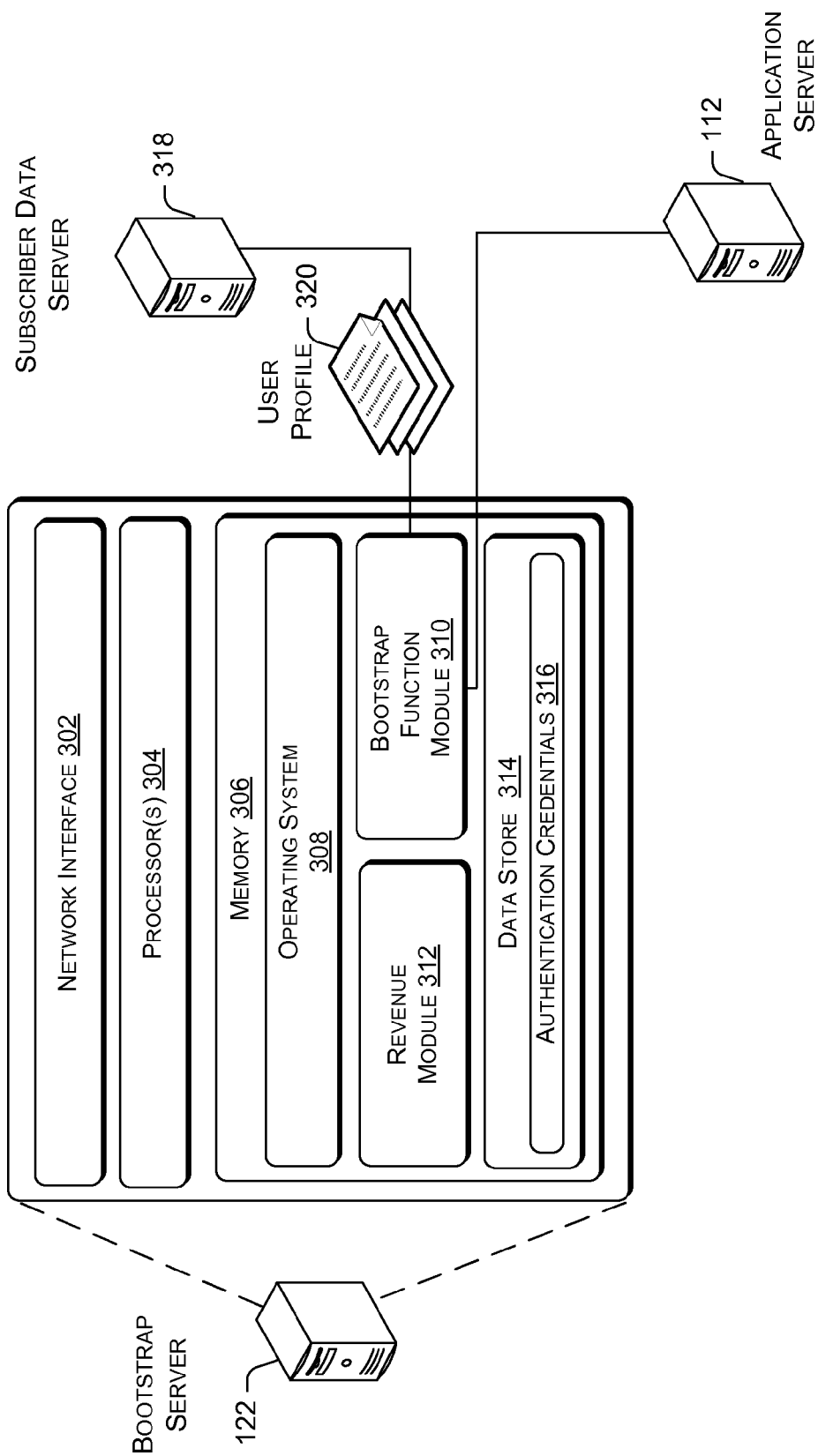
FIG. 3 is a block diagram that illustrates selected components of a bootstrap server that provides authentication credentials to a bootstrap authentication framework and an application server.

FIG. 3 is a block diagram that illustrates selected components of the bootstrap server 122 that provides authentication credentials to a bootstrap authentication framework and an application server. The bootstrap server 122 may include a network interface 302, one or more processors 304, memory 306, and/or user controls that enable a user to interact with the bootstrap. The network interface 302 may include wireless and/or wired communication components that enable the server to transmit data to and receive data from other networked devices.

The memory 306 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism.

The one or more processors 304 and the memory 306 of the bootstrap server 122 may implement an operating system 308. The operating system 308 may include components that enable the bootstrap server 122 to receive and transmit data via various inputs (e.g., user controls, network interfaces, and/or memory devices), as well as process data using the one or more processors 304 to generate output. The operating system 308 may include a presentation component that presents the output (e.g., display the data on an electronic display, store the data in memory, transmit the data to another electronic device, etc.). Additionally, the operating system 308 may include other components that perform various additional functions generally associated with an operating system. The one or more processors 304 and the memory 306 of the bootstrap server 122 may also implement a bootstrap function module 310 and a revenue module 312. The memory 306 may also include a data store 314.

The bootstrap function module 310 may perform the bootstrap authentication functions 124. The bootstrap authentication functions 124 may include performing mutual authentication with bootstrap authentication frameworks on various electronic devices to obtain share secrets in the form of authentication credentials 316. For example, the bootstrap function module 310 may perform mutual authentication with the bootstrap authentication framework 120 to agree on the authentication credentials 228. In at least one embodiment, the authentication credentials 228 may include a temporary identifier and a shared secret key. The bootstrap function module 310 may store the mutually agree on authentication credentials 316 in the data store 314.

The bootstrap authentication functions 124 may also include sending the authentication credentials 316 to the application servers, such as the application server 112. For example, the application server 112 may send a request that includes a temporary identifier of an electronic device to the bootstrap server 122. In turn, the bootstrap function module 310 may return the secret key associated with the temporary identifier to the application server 112. In turn, the application server 112 may compare the secret key received from the bootstrap server 122 with a secret key that is received from the electronic device. Accordingly, the application server 112 may provide data and/or service to the electronic device when the two secret keys match.

In some embodiments, the bootstrap authentication functions 124 may additionally include sending a user profile that corresponds to a received temporary identifier to the application server (e.g., application server 112). The bootstrap function module 310 may send the user profile, such as the user profile 320, along with the corresponding secret key to the application server 112. In such embodiments, the bootstrap function module 310 may retrieve the user profile from a subscriber data server 318 that is part of the telecommunication network 102. Each user profile may include security settings, user preferences, demographic information, and/or the like that are associated with a corresponding user. For example, the application server 112 may apply the user profile to determine the amount or level of access to data and/or service that is granted to the electronic device corresponding to the temporary identifier.

The revenue module 312 may track the number of times that the secret key and/or user profile associated with an electronic device is provided to an application server, such as the application server 112. Further, the revenue module 312 may assess a fee for one or more of such occurrences. The fee may be assessed against the service provider that is operating the application server. Alternatively or concurrently, the fee may be assessed against the subscriber who is accessing the data or service provided by the application server 112. In various embodiments, the fee may be assessed on a per occurrence basis or on a flat fee basis. In this way, the operator of the telecommunication network 102 may realize an additional revenue stream.

The bootstrap function module 310 and the revenue module 312 are illustrated in FIG. 3 as being implemented by a dedicated bootstrap server 122. However, at least one of the bootstrap function module 310 and the revenue module 312 may also be implemented by any existing component of the telecommunication network 102. For example, the bootstrap function module 310 may be implemented by a server of the service node 106.

Example Procedures

Figure 4:
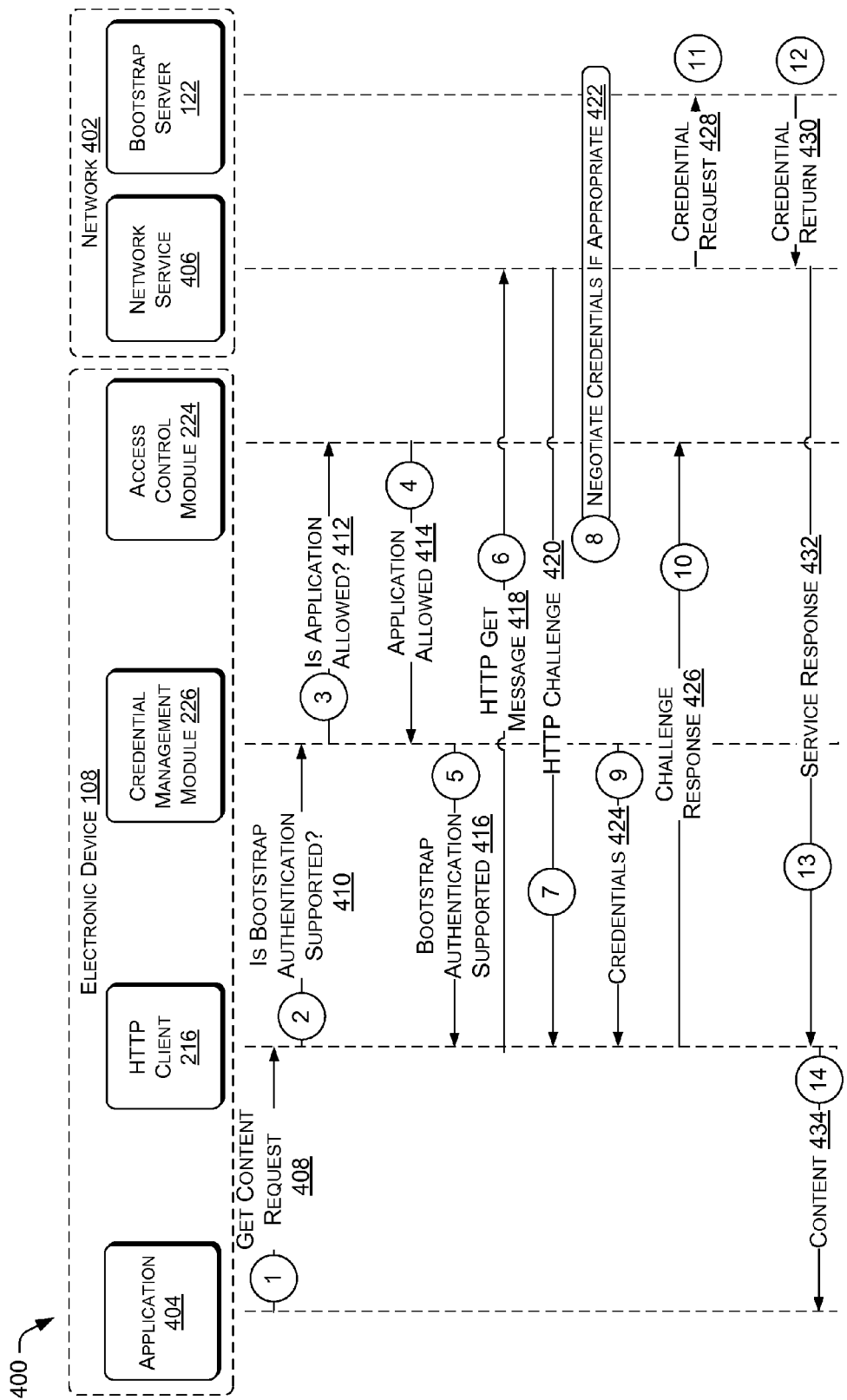
FIG. 4 is a schematic diagram that shows procedures for using the bootstrap authentication framework of an electronic device to authenticate an application to an application server when a protocol handler on the electronic device inherits the digital signature of the application.

FIG. 4 is a schematic diagram that shows procedures 400 for using the bootstrap authentication framework of an electronic device to authenticate an application to an application server. The procedures 400 may include steps that exchange data between components on the electronic device 108 and servers on a network 402. The components on the electronic device 108 may include an application 404, the HTTP client 216, the credential manager module 226, and the access control module 224. The servers of the network 402 may include a network service 406 and the bootstrap server 122. The network service 406 may be provided by the application server 112. In this scenario, the HTTP client 216 may be a protocol handler that inherits the digital signature of the application 404.

At step one, the application 404 may generate a get content request 408. For example, the application 404 may be a navigation application, and the get content request 408 may be request to obtain map data. At step two, the HTTP client 216 may pass a support request 410 to the credential management module 226. The support request 410 may indicate that the HTTP client 216 desires to use bootstrap authentication, i.e., SIM-based authentication credentials to authenticate to the application server 112.

At step three, the credential management module 236 may send a request 412 that asks the access control module 224 whether the HTTP client 216 has access control to access the SIM-based authentication credentials. In turn, the access control module 224 may determine the access control status for the HTTP client 216 based on a digital signature that the HTTP client 216 inherited from the application 502. In some embodiments, the access control module 224 may also look at the access control settings for the HTTP client 216 to determine the access control status. At step four, assuming that the HTTP client 216 does have access control, the access control module 224 may send a response 414 to the credential management module 226 indicating that the HTTP client 216 is able to access the SIM-based authentication credentials. In turn, at step five, the credential management module 226 may return a response 416 to the HTTP client 216 indicating that the HTTP client 216 is supported by the credential management module 226.

At step six, the HTTP client 216 may send a HTTP get request message 418 to a network service 406. The HTTP get message 418 may include an indicator that the HTTP client 216 is capable of bootstrap authentication, i.e., has access to the SIM-based authentication credentials. At step seven, the application server 112 may return a HTTP challenge message 420. The HTTP challenge message 420 may be a HTTP "401 error" message indicating that access to a network service 406 is not authorized. However, the HTTP challenge message 420 may include an indicator that the network service 406 on the application server 112 supports bootstrap authentication. The HTTP client 216 may convey the HTTP challenge message 420 to the bootstrap module 222 of the bootstrap authentication framework 120.

At step eight, the bootstrap module 222 may determine whether valid authentication credentials are already stored in the SIM 214 of the electronic device 108. The SIM 214 may include valid authentication credentials if the bootstrap module 222 has previously negotiated and agreed on authentication credentials for the electronic device 108 with the bootstrap server 122, and the authentication credentials have not expired. However, no valid authentication credentials may be presented in the SIM 214 if the bootstrap module 22 has not previously agreed on valid authentication credentials with the bootstrap server 122, or if the authentication credentials have expired. In the latter case, the bootstrap module 222 may negotiate and agree on a new set of authentication credentials 422 with the bootstrap server 122 in a negotiation 424.

At step nine, the credential management module 226 may provide the SIM-stored authentication credentials to the HTTP client 216. The authentication credentials may include a temporary identifier and a shared secret key. In some embodiments, the temporary identifier may be a Bootstrap Transaction Identifier (B-TID), and the shared secret key may be a KS_int_NAF as specified by the GBA.

At step ten, the HTTP client 216 may return a challenge response 426 to the network service 406 on the application server 112 that is responsive to the HTTP challenge message 420. The challenge response 426 may include the authentication credentials. At step eleven, the network service 406 may send a credential request 428 to the bootstrap server 122. The credential request 428 may ask that the bootstrap function module 310 on the bootstrap server 122 provide the shared secret key that corresponds to the temporary identifier. In at least some embodiments, the credential request 428 may also ask the bootstrap function module 310 for a user profile that corresponds to the temporary identifier.

At step twelve, the bootstrap server 122 may return the shared key and/or the user profile to the network service 406 in a credential return 430. The network service 406 may determine whether the secret key that was received from the bootstrap server 122 for the temporary password matches the secret key that the bootstrap server received from the HTTP client 216 in the challenge response 426.

At step thirteen, assuming that the two secret keys match, the network service 406 may send a service response 432 to the HTTP client 216. The service response 432 may include data and/or service that are provided to the application 404. In at least some embodiments, the nature of the data and/or service that is provided may be dependent on the user profile that is supplied by the bootstrap server 122. At step fourteen, the HTTP client 216 may relay the content 434 that results from the data and/or service provided by the network service 406 to the application 404.

Figure 5:
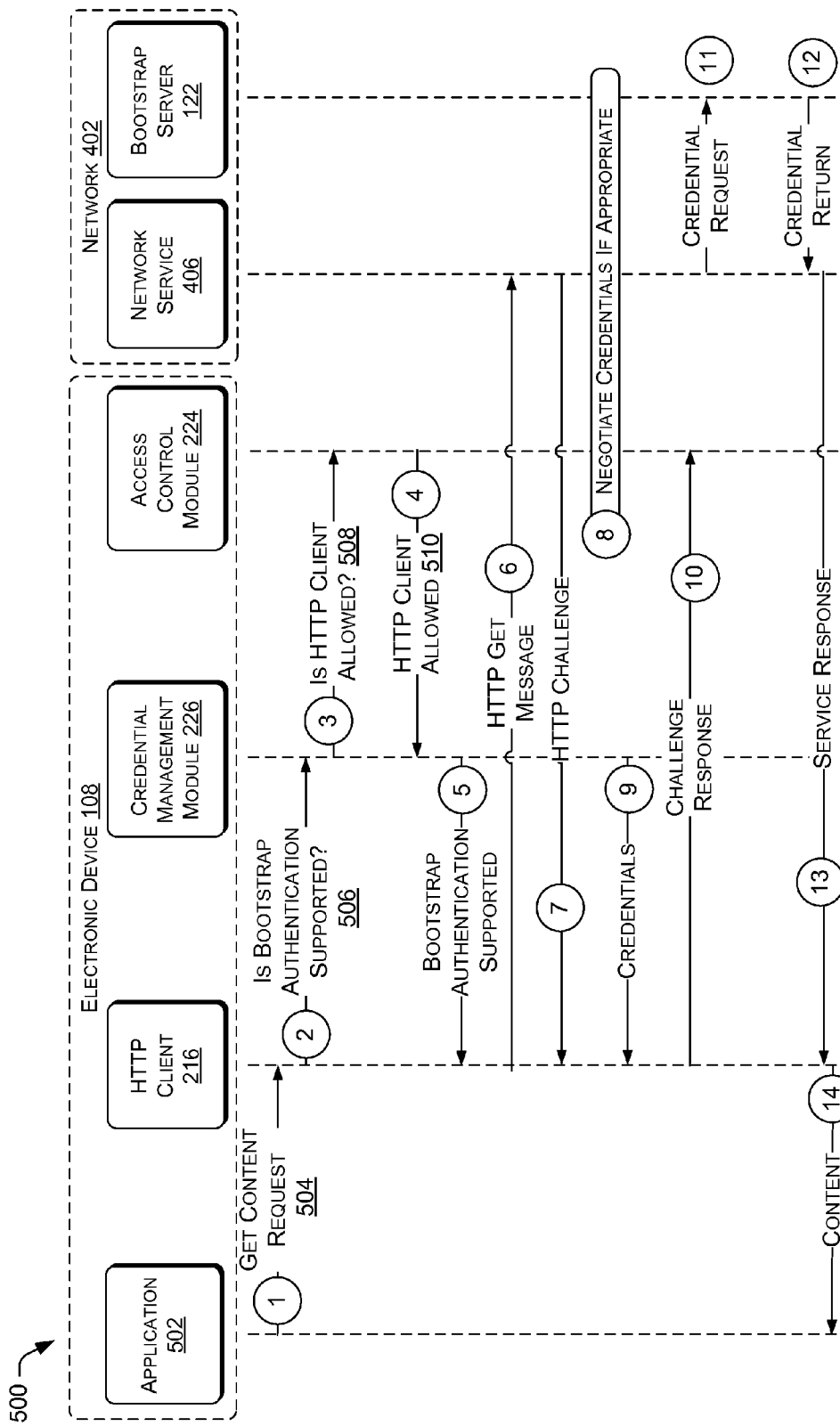
FIG. 5 is a schematic diagram that shows procedures for using the bootstrap authentication framework of an electronic device to authenticate an application to an application server when a protocol handler on the electronic device has a digital signature that is different from the digital signature of the application.

FIG. 5 is a schematic diagram that shows procedures 500 for using the bootstrap authentication framework of an electronic device to authenticate an application to an application server. The procedures 500 may include steps that exchange data between components on the electronic device 108 and servers on a network 402. The components on the electronic device 108 may include an application 502, the HTTP client 216, the credential manager module 226, and the access control module 224. The servers of the network 402 may include the network service 406 and the bootstrap server 122. The network service 406 may be provided by the application server 112. In this scenario, the HTTP client 216 may be a protocol handler that has a digital signature that is different from the digital signature of the application 502.

At step one, the application 502 may generate a get content request 504. For example, the application 502 may be a navigation application, and the get content request 504 may be request to obtain map data. At step two, the HTTP client 216 may pass a support request 506 to the credential management module 226. The support request 506 may indicate that the HTTP client 216 desires to use bootstrap authentication, i.e., use SIM-based authentication credentials to authenticate to the application server 112.

At step three, the credential management module 236 may send a request 508 that asks the access control module 224 whether the HTTP client 216 has access control to access the SIM-based authentication credentials. In turn, the access control module 224 may determine the access control status for the HTTP client 216 based on a digital signature of the HTTP client 216. In some embodiments, the access control module 224 may also look at the access control settings for the HTTP client 216 to determine the access control status. At step four, assuming that the HTTP client 216 does have access control, the access control module 224 may send a response 510 to the credential management module 226 indicating that the HTTP client 216 is able to access the SIM-based authentication credentials. The remaining steps of the procedures 500 are similar to their respective counterpart steps in the procedures 400 shown in FIG. 4. Accordingly, the details of the steps are as described in their counterparts in FIG. 4.

While the procedures 400 and 500 are discussed with respect to HTTP client 216, the use of bootstrap authentication credentials stored in the SIM of the electronic device 108 to authenticate an application to a network service may be used in conjunction with other protocol handlers. These other protocol handler may be protocol handlers that inherit the digital signature of their calling application, or protocol handlers that have their own unique digital signatures. In an example in which the protocol handler is the TLS client 218, the access control module 224 may verify that the TLS client 218 has access to the SIM-stored authentication credentials prior to the initiation of a TLS tunnel with the network service 406. The TLS client may further request SIM-stored authentication credentials from the credential management module upon receiving a "server hello done" message during the establishment of the TLS tunnel. The "server hell done" message may include an indicator that the network service 406 on the application server 112 supports bootstrap authentication, i.e., authentication via the authentication credentials 228. Subsequently, the bootstrap module 222 may negotiate for the authentication credentials from the bootstrap server 122 for storage in the SIM 214 if no valid authentication credentials are available in the SIM 214. The TLS tunnel may then be established based on the authentication credentials. Other protocol handlers such as IMAP, FTP, and SSL may also integrate the use of bootstrap authentication access control status checking and the SIM-stored authentication credentials in their protocol procedures when establishing encrypted or unencrypted communication links with network services. For example, because of such integration, the SIM-stored authentication credentials may pass through any encrypted communication links as natively encrypted data. Accordingly, the protocol procedures and protocol handlers described in FIGS. 4 and 5 are examples rather than limitations.

Example Operations

Figure 6:
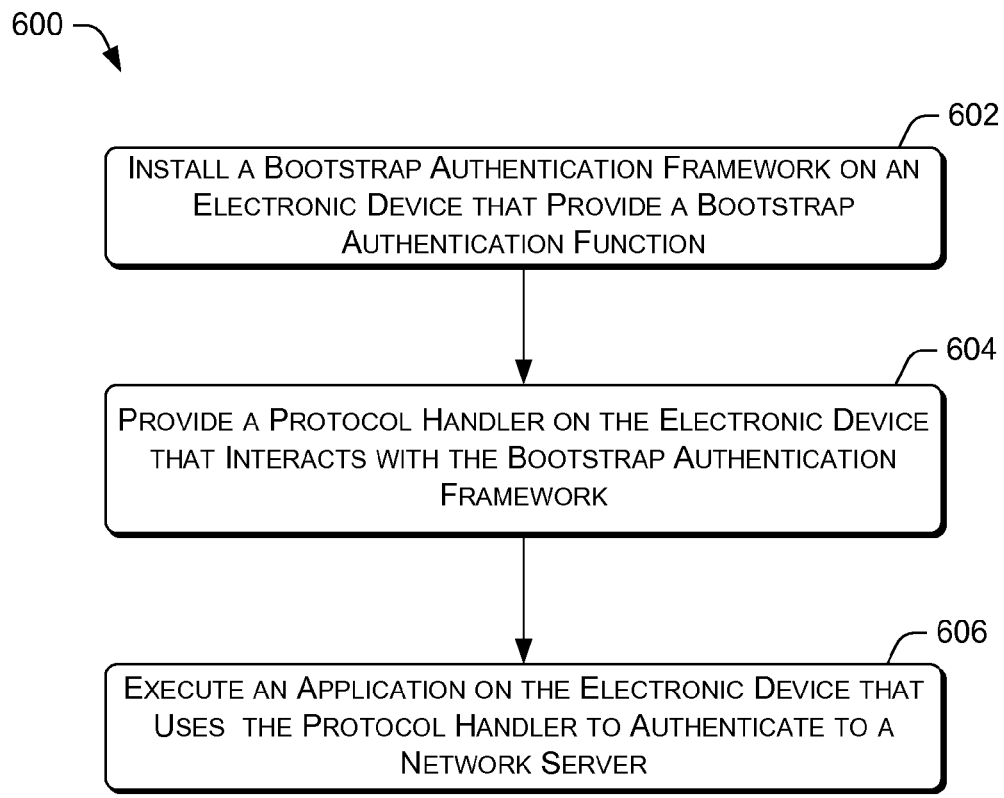
FIG. 6 shows a flow diagram of an example process for implementing a bootstrap authentication framework on an electronic device for use by an application.
Figure 7:
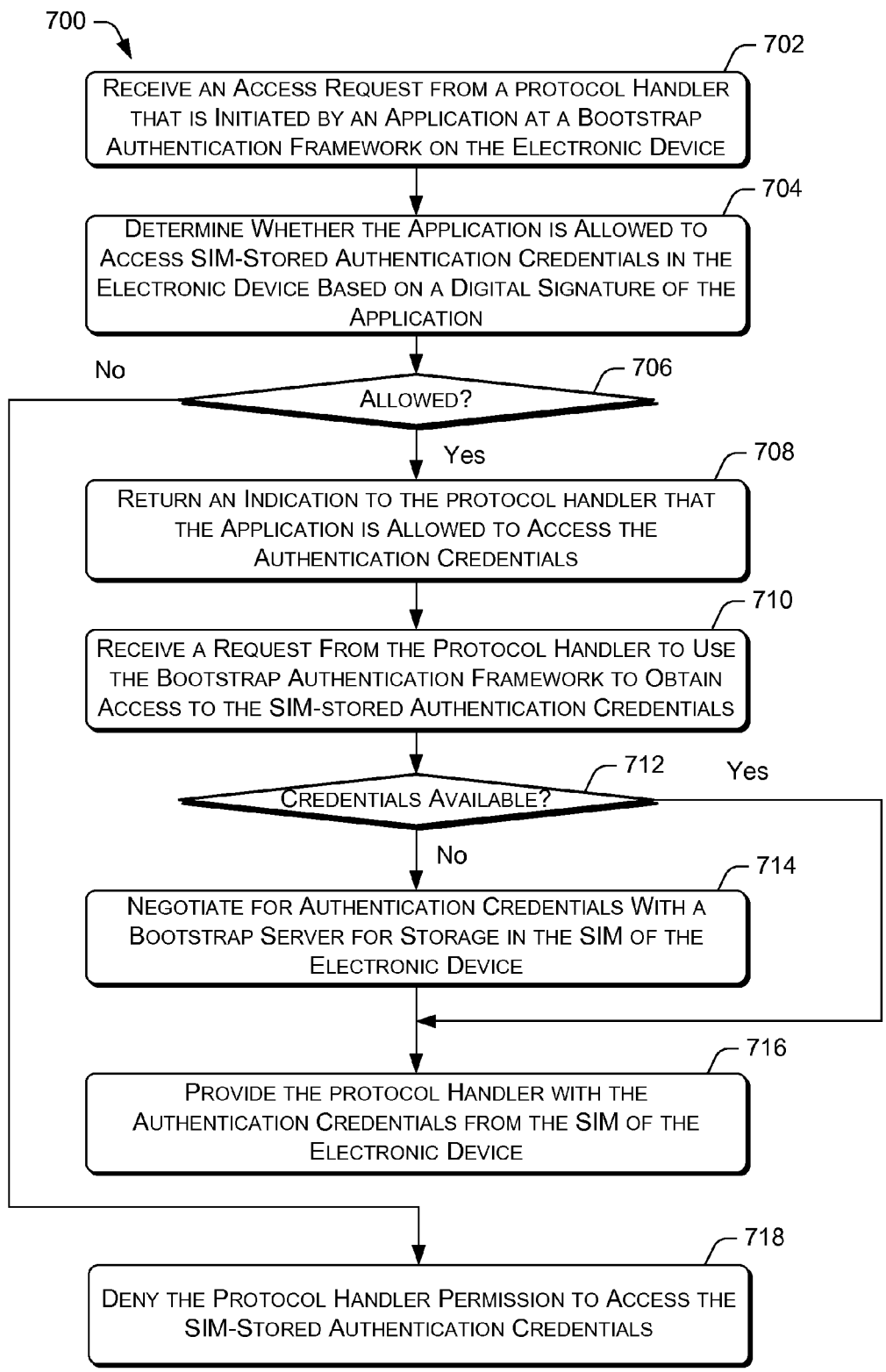
FIG. 7 shows a flow diagram of an example process for providing a protocol handler access to the bootstrap authentication framework to obtain the authentication credentials from the SIM of the electronic device when the protocol handler on the electronic device inherits the digital signature of an application.
Figure 8:
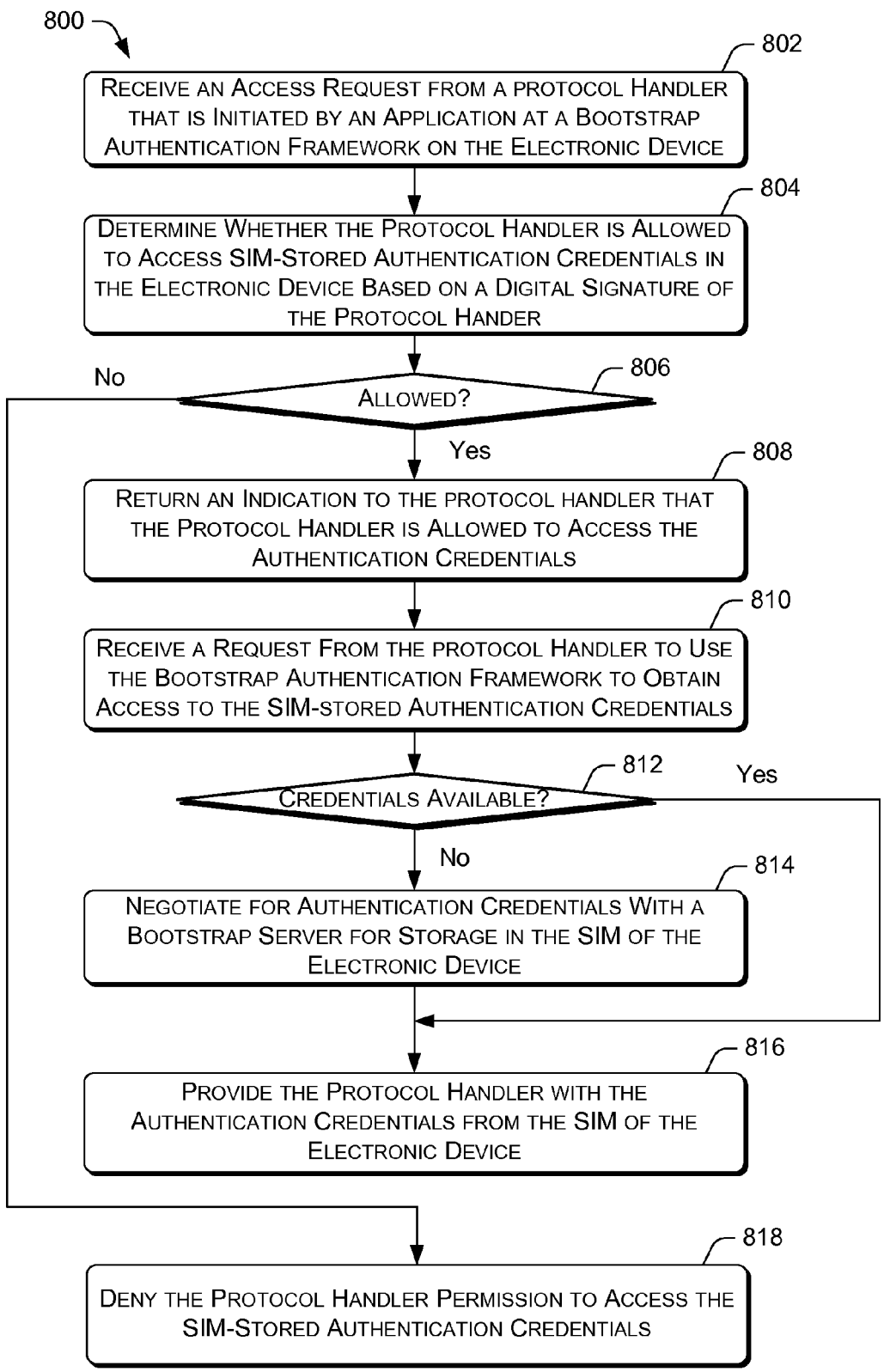
FIG. 8 shows a flow diagram of an example process for providing a protocol handler access to the bootstrap authentication framework to obtain the authentication credentials from the SIM of the electronic device when the protocol handler on the electronic device has a digital signature that is different from the digital signature of an application.

FIGS. 6-8 present illustrative processes 600-800 for implementing a bootstrap authentication framework on an electronic device that facilitates the authentication of the applications on the electronic device to an application server. Each of the processes 600-800 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 600-800 are described with reference to the environment 100 of FIG. 1.

FIG. 6 shows a flow diagram of an example process 600 for implementing the bootstrap authentication framework 120 on the electronic device 108 for use by the application 110. At block 602, the bootstrap authentication framework 120 may be installed on the electronic device 108. In some embodiments, the bootstrap authentication framework 120 may be installed by a corresponding installation program that executes on the electronic device 108. The bootstrap authentication framework 120 may provide a bootstrap authentication function that enables authentication of the application 110 using authentication credentials 228 that are stored in the SIM 214 of the electronic device 108. In various embodiments, the authentication credentials 228 may include a temporary identifier and a shared secret key.

At block 604, a protocol handler may be provided on the electronic device 108. The protocol handler may be installed by a corresponding installation program that executes on the electronic device 108. The protocol handler may be the HTTP client 216, the TLS client 218, or another protocol handler. The protocol handler may access the authentication credentials 228 through the bootstrap authentication framework 120 by calling on APIs provided by the bootstrap authentication framework 120. In this way, the bootstrap authentication framework 120 may function as an extension of the protocol handler.

At block 606, the application 110 may be executed on the electronic device 108. In instances in which the protocol handler is a library that is integrated with the application 110, the application 110 may be installed by the same installation program as the protocol handler. However, in instances in which the protocol handler is an independently executing application that offers services to the application, the application 110 may be installed by a corresponding installation program that executes on the electronic device 108. In various embodiments, the application 110 may use the protocol handler to authenticate to an application server 112 so that the application 110 may obtain data or services from the application server 112. The use of the protocol hander by the application 110 to access the bootstrap authentication framework 120 means that the application 110 may be developed without awareness of the functionalities provided by the bootstrap authentication framework 120. Thus, the development of the application 110 may remain simplified.

FIG. 7 shows a flow diagram of an example process 700 for providing a protocol handler access to the bootstrap authentication framework 120 to obtain the authentication credentials 228 from the SIM 214 of the electronic device 108 when the protocol handler inherits the digital signature of an application.

At block 702, the bootstrap authentication framework 120 of the electronic device 108 may receive an access request from a protocol handler that is initiated by the application 110 on the electronic device 108. The protocol handler may be the HTTP client 216, the TLS client 218, or another protocol handler.

At block 704, the bootstrap authentication framework 120 may determine whether the application 110 is allowed to access SIM-stored authentication credentials in the electronic device 108. The bootstrap authentication framework 120 may make the determination based on a comparison of a digital signature that the protocol handler inherited from the application 110 to authorized digital signatures that are stored in the electronic device 108 or on the bootstrap server 122. Accordingly, the bootstrap authentication framework 120 may allow the protocol handler to access the authentication credentials when the digital signature provided by the protocol handler matches one of the authorized digital signatures. Otherwise, the protocol handler may be denied access.

Accordingly, at decision block 706, if the bootstrap authentication framework 120 determines that the protocol handler is allowed access to authentication credentials stored in the SIM ("yes" at decision block 706), the process 700 may proceed to block 708. At block 708, the bootstrap authentication framework 120 may return an indication to the protocol handler that the application 110 is allowed to access the SIM-stored authentication credentials.

At block 710, the bootstrap authentication framework 120 may receive a request from the protocol handler to use the bootstrap authentication framework to obtain access to the SIM-stored authentication credentials. In various embodiments, the protocol handler may make such a request as the protocol handler attempts to access data or services that are stored in the application server 112.

At decision block 712, the bootstrap authentication framework 120 may determine whether the authentication credentials are available from the SIM 214 of the electronic device 108. The bootstrap authentication framework 120 may consider the authentication credentials available when the non-expired authentication credentials are present in the SIM 214. Thus, if the bootstrap authentication framework 120 determines that the authentication credentials are not available ("no" at decision block 712), the process 700 may proceed to block 714.

At block 714, the bootstrap authentication framework 120 may negotiate for the authenticate credentials with the bootstrap server 122 for storage in the SIM 214 of the electronic device 108. The negotiation may include the bootstrap authentication framework 120 and the bootstrap server 122 mutually authenticating through the use of authentication keys and/or digital certificates that are stored in the SIM 214 of the electronic device 108 and known to the bootstrap authentication functions 124 of the bootstrap server 122. Subsequently, the bootstrap authentication functions 124 and the bootstrap module 22 may agree on shared secrets, i.e., the authentication credentials. The authentication credentials may be the authentication credentials 228 that are stored in the SIM 214 of the electronic device 108.

At block 716, the bootstrap authentication framework 120 may provide the protocol handler with the authentication credentials from the SIM 214 of the electronic device 108. In various embodiments, the protocol handler may use the authentication credentials to authenticate the application 110 on the electronic device 108 to the application server 112.

Returning to decision block 712, if the bootstrap authentication framework 120 determines that the authentication credentials are available from the SIM 214 of the electronic device 108 ("yes" at decision block 712), the process 700 may proceed directly to block 716.

Returning to decision block 706, if the bootstrap authentication framework 120 determines that the protocol handler is not allowed access to any authentication credentials stored in the SIM ("no" at decision block 706), the process 700 may proceed to block 718. At block 718, the bootstrap authentication framework 120 may deny the protocol handler access control to access the SIM-stored authentication credentials.

FIG. 8 shows a flow diagram of an example process 800 for providing a protocol handler access to the bootstrap authentication framework 120 to obtain the authentication credentials from the SIM 214 of the electronic device 108 when the protocol handler on the electronic device 108 has a digital signature that is different from the digital signature of an application.

At block 802, the bootstrap authentication framework 120 of the electronic device 108 may receive an access request from a protocol handler that is initiated by the application 110 on the electronic device 108. The protocol handler may be the HTTP client 216, the TLS client 218, or another protocol handler.

At block 804, the bootstrap authentication framework 120 may determine whether the protocol handler is allowed to access SIM-stored authentication credentials in the electronic device 108. The bootstrap authentication framework 120 may make the determination based on a comparison of a digital signature that is unique to the protocol handler and authorized digital signatures that are stored in the electronic device 108 or on the bootstrap server 122. Accordingly, the bootstrap authentication framework 120 may allow the protocol handler to access the authentication credentials when the digital signature unique to the protocol handler matches one of the authorized digital signatures. Otherwise, the protocol handler may be denied access.

Accordingly, at decision block 806, if the bootstrap authentication framework 120 determines that the protocol handler is allowed access to the authentication credentials stored in the SIM ("yes" at decision block 806), the process 800 may proceed to block 808. At block 808, the bootstrap authentication framework 120 may return an indication to the protocol handler that the protocol handler is allowed to access the SIM-stored authentication credentials.

At block 810, the bootstrap authentication framework 120 may receive a request from the protocol handler to use the bootstrap authentication framework to obtain access to the SIM-stored authentication credentials. In various embodiments, the protocol handler may make such a request as the protocol handler attempts to access data or services that are stored in the application server 112.

At decision block 812, the bootstrap authentication framework 120 may determine whether the authentication credentials are available from the SIM 214 of the electronic device 108. The bootstrap authentication framework 120 may consider the authentication credentials available when the non-expired authentication credentials are present in the SIM 214. Thus, if the bootstrap authentication framework 120 determines that the authentication credentials are not available ("no" at decision block 812), the process 800 may proceed to block 814.

At block 814, the bootstrap authentication framework 120 may negotiate for authenticate credentials with the bootstrap server 122 for storage in the SIM 214 of the electronic device 108. The negotiation may include the bootstrap authentication framework 120 and the bootstrap server 122 mutually authenticating through the use of authentication keys and/or digital certificates that are stored in the SIM 214 of the electronic device 108 and known to the bootstrap authentication functions 124 of the bootstrap server 122. Subsequently, the bootstrap authentication functions 124 and the bootstrap module 22 may agree on shared secrets, i.e., the authentication credentials. The authentication credentials may be the authentication credentials 228 that are stored in the SIM 214 of the electronic device 108.

At block 816, the bootstrap authentication framework 120 may provide the protocol handler with the authentication credentials from the SIM 214 of the electronic device 108. In various embodiments, the protocol handler may use the authentication credentials to authenticate the application 110 on the electronic device 108 to the application server 112.

Returning to decision block 812, if the bootstrap authentication framework 120 determines that the authentication credentials are available from the SIM 214 of the electronic device 108 ("yes" at decision block 812), the process 800 may proceed directly to block 816.

Returning to decision block 806, if the bootstrap authentication framework 120 determines that the protocol handler is not allowed access to any authentication credentials stored in the SIM ("no" at decision block 806), the process 800 may proceed to block 818. At block 818, the bootstrap authentication framework 120 may deny the protocol handler access control to access the SIM-stored authentication credentials.

The implementation of the bootstrap authentication framework in the electronic device may provide several advantages over traditional techniques such as subscriber profile insertion for the purpose of authentication to application servers. For example, unlikely subscriber profile insertion techniques, the bootstrap authentication framework may automatically provide stored authentication credentials for authentication even when the electronic device is connected to an application server via a Wi-Fi connection.

Furthermore, the bootstrap authentication framework may automatically provide the stored authentication credentials to an application server even when an application is engaged in encrypted communication with the application server. In contrast, traditional techniques such as subscriber profile insertion are generally incompatible with encrypted communication links.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

We claim:
1. One or more computer storage devices storing computer-executable instructions that, when executed, cause one or more processors to perform acts comprising:
   receiving, at a bootstrap authentication framework of an electronic device, an access request from a protocol handler for authentication credentials stored in a subscriber identity module (SIM) of the electronic device, the access request including a bootstrap transaction identifier that is associated with the electronic device, the authentication credentials including a shared secret key;
   determining that the protocol handler is allowed to access the authentication credentials;
   associating the shared secret key of the authentication credentials with the bootstrap transaction identifier of the access request; and
   providing the authentication credentials to the protocol handler in response to the bootstrap authentication framework determining that the protocol handler is allowed to access the authentication credentials,
   wherein the access request is initiated by an application that uses the authentication credentials to access a network service on an application server, and
   wherein the bootstrap authentication framework allows the protocol handler to access the authentication credentials when a digital signature associated with the protocol handler is located in a particular file location on the electronic device.

2. The one or more computer storage devices of claim 1, further comprising negotiating the authentication credentials with a bootstrap server based on at least one of an authentication key or a digital certificate shared by the electronic device and the bootstrap server.

3. The one or more computer storage devices of claim 2, wherein the negotiating includes negotiating the authentication credentials following an initiation of a data request or a service request by the application to the network service.

4. The one or more computer storage devices of claim 2, wherein the protocol handler provides the authentication credentials to the network service to authenticate the electronic device to the network service.

5. The one or more computer storage devices of claim 4, wherein the negotiating includes negotiating the authentication credentials such that the bootstrap server provides the shared secret key and a user profile that corresponds to the bootstrap transaction identifier to the network service upon a credential request from the network service, and wherein the network service compares the shared secret key from the protocol handler and a corresponding shared secret key from the bootstrap server to authorize access to the network service by the application.

6. The one or more computer storage devices of claim 1, wherein the authentication credentials stored in the SIM of the electronic device is inaccessible to the protocol handler or the application without the bootstrap authentication framework of the electronic device.

7. The one or more computer storage devices of claim 1, wherein providing the authentication credentials to the protocol handler occurs in response to receiving a message from the network service that indicates the network service supports authentication via the authentication credentials.

8. The one or more computer storage devices of claim 1, wherein the digital signature associated with the protocol handler is a unique digital signature of the protocol handler or an inherited digital signature that the protocol handler obtained from the application.

9. The one or more computer storage devices of claim 1, wherein the protocol handler is a Hypertext Transfer Protocol (HTTP) client or a transfer layer security (TLS) client.

10. A system, comprising:
one or more processors; and
memory that includes a plurality of computer-executable components comprising:
a credential management component of a bootstrap authentication framework that receives a request from a protocol handler for authentication credentials stored in a subscriber identity module (SIM) of an electronic device, the request including a bootstrap transaction identifier associated with the electronic device, wherein the request is initiated for an application that uses the authentication credentials to access a network service on an application server, wherein the authentication credentials include a shared secret key; and
an access control component of the bootstrap authentication framework that permits the protocol handler to access the authentication credentials stored in the SIM of the electronic device at least in response to determining that a digital signature associated with the protocol handler is an authorized digital signature, wherein the credential management component associates the shared secret key of the authentication credentials with the bootstrap transaction identifier of the request, and further provides the authentication credentials to the protocol handler based at least in part on determining that the protocol handler is located in a particular file location that corresponds to a system partition of an operating system on the electronic device.

11. The system of claim 10, wherein the memory further includes a bootstrap component of the bootstrap authentication framework that obtains the authentication credentials from a bootstrap function on a bootstrap server based on at least one of an authentication key or a digital certificate that is shared by the electronic device and the bootstrap function.

12. The system of claim 11, wherein the bootstrap function provides the shared secret key and a user profile that corresponds to the bootstrap transaction identifier to the network service upon a credential request from the network service, and wherein the network service compares the shared secret key from the protocol handler and a corresponding shared secret key from the bootstrap server to authorize access to the network service by the application.

13. The system of claim 12, wherein the memory further includes a revenue component of the bootstrap authentication framework that collects a fee from a service provider of the network service in exchange for providing at least one of the shared secret key or the user profile to the network service.

14. The system of claim 10, wherein the digital signature associated with the protocol handler is a unique digital signature of the protocol handler or an inherited digital signature that the protocol handler obtained from the application.

15. A computer-implemented method, comprising:
installing a bootstrap authentication framework on an electronic device, the bootstrap authentication framework providing access to authentication credentials stored in a subscriber identity module (SIM) of an electronic device;
providing a protocol handler on the electronic device, the protocol handler interacting with the bootstrap authentication framework via a request to access the authentication credentials stored in the SIM of the electronic device, the request including at least a bootstrap transaction identifier associated with the electronic device; and
executing, on the electronic device, an application that uses the protocol handler to obtain the authentication credentials from the SIM of the electronic device to authenticate to an application server, the authentication credentials include a shared secret key,
wherein the bootstrap authentication framework associates the shared secret key of the authentication credentials with the bootstrap transaction identifier of the request, and further provides the authentication credentials to the protocol handler in response to determining that the protocol handler is located in a particular file location on the electronic device.

16. The computer-implemented method of claim 15, wherein the protocol handler is a library that is loaded and executed in an identical process as the application or an independently executing application that offers services to the application.

17. The computer-implemented method of claim 15, wherein the protocol handler includes a first digital signature that is different from a digital signature of the application or a second digital signature that is inherited from the application.

18. The computer-implemented method of claim 15, wherein bootstrap authentication framework obtains the authentication credentials from a bootstrap server based on at least one of an authentication key or a digital certificate that is shared by the electronic device and the bootstrap server.

19. The one or more computer storage device of claim 1, wherein providing the authentication credentials to the protocol handler is further based at least in part on additional access control settings that correspond to the protocol handler, the additional access control settings being stored on the bootstrap authentication framework.

20. The one or more computer storage device of claim 1, wherein the particular file location on the electronic device corresponds to a system partition of an operating system of the electronic device.

\* \* \* \* \*